United States Patent [19]

Günzel

[11] Patent Number: 4,786,452

[45] Date of Patent: Nov. 22, 1988

[54] METHOD FOR MANUFACTURING SHEETS OF HIGHLY WEAR-RESISTANT PLASTICS MATERIAL

[75] Inventor: Bodo Günzel, Telgte, Fed. Rep. of Germany

[73] Assignee: Cimatec Chemischtechnische Handalsgesellschaft mbH

[21] Appl. No.: 658,483

[22] Filed: Oct. 9, 1984

[30] Foreign Application Priority Data

Oct. 7, 1983 [DE] Fed. Rep. of Germany ....... 3336511

[51] Int. Cl.⁴ ................... B29C 39/20; B29C 33/56; B29C 45/16
[52] U.S. Cl. ............................... 264/129; 264/132; 264/152; 264/158; 264/160; 264/244; 264/331.19; 425/543; 425/307
[58] Field of Search ............... 264/331.19, 158, 160, 264/152, 244, 129, 132; 425/543, 307

[56] References Cited

U.S. PATENT DOCUMENTS

| 1,817,287 | 4/1931 | Bell | 264/158 X |
| 3,504,079 | 3/1970 | Hall | 264/244 X |
| 3,718,726 | 2/1973 | Taylor | 264/244 X |
| 4,301,110 | 11/1981 | Cuscurida et al. | 264/331.19 X |
| 4,309,378 | 1/1982 | Ganster et al. | 264/331.19 X |

FOREIGN PATENT DOCUMENTS

56-166019 12/1981 Japan ................... 264/158

OTHER PUBLICATIONS

Battenfeld Brochures "Maschinen und Anlagen für Die Polyurethanverarbeitung Reaktionsbiebmaschinen Werkzeusträger, Tanklager", Battenfeld Polyurethantechnik, Postfach 1164/65, D-5882 Meinezhagen, Sep. 1984, 21 pp.

Saechtling, HansJürgen *Kunststoff Taschenbuch*, 22 Ausgabe, Carl Hanser Verlag Munchen Wien, ©1983, pp. 60 and 61.

*Dictionary of Plastics,* Third Edition, by J. A. Wordingham and P. Reboul, Feltham, Middlesex, England, Newnes Books, ©1968, pp. 32, 89 and 118.

*Whittington's Dictionary of Plastics,* by Lloyd R. Whittington Stamford, Conn., Technomic, ©1968, Preface; pp. 38, 124 and 157.

Primary Examiner—Philip Anderson
Attorney, Agent, or Firm—Toren, McGeady & Associates

[57] ABSTRACT

In a method of manufacturing sheets of highly wear-resistant plastics material, particularly for manufacturing covers subjected to wear, such as, for example, belts, straps, shoe soles or the like, the behavior of the sheets, particularly as far as suppleness, wear-resistance and inexpensiveness in the production are concerned, is to be significantly improved over known sheets of leather or rubber. The blanks manufactured from such sheets are to have the same properties. According to the invention, sheets are manufactured in a high-pressure casting method from a mixture of polyol and a filter portion of up to 30% with the addition of isocyanate, chalk being particularly used as filler.

5 Claims, 2 Drawing Sheets

METHOD FOR MANUFACTURING SHEETS OF HIGHLY WEAR-RESISTANT PLASTICS MATERIAL

BACKGROUND OF THE INVENTION

The invention relates to a method and apparatus for manufacturing sheets of highly wear-resistant plastics material, particularly for the manufacture of covers or coatings which are subjected to abrasion, such as, for example, belts, straps, shoe soles, or the like.

In the past, products of this type were made particularly of leather. In the meantime, it has become known to manufacture these products of rubber, it being attempted to provide the rubber mixtures with a relatively high stability against abrasion.

However, it has been found that the resistance against abrasion of such rubber blanks is still not satisfactory. Also the raw material is relatively expensive, and blanks cut from such a material are therefore also expensive. It is understood that blanks of this type from leather are even more expensive.

It is the object of the invention to provide a method which makes possible the manufacture of sheets whose behavior, particularly with respect to suppleness, abrasion resistance, and inexpensiveness of production, is substantially improved over known sheets of rubber or leather. It is also an object of the invention to provide an appropriate apparatus for carrying out the method, as well as a shoe sole as a blank from such a sheet.

SUMMARY OF THE INVENTION

According to the invention, in the method of the above-described type, this object is met by manufacturing the sheets in a high-pressure casting method from a mixture of polyol with a filler portion of 0-30% with the addition of isocyanate.

It has been found that sheets of this type best meet the requirements made of them particularly if, as also provided by the invention, chalk is used as filler.

Depending upon the field of application of the products which are to be produced from the sheets manufactured in this manner, it may be useful to produce sheets having two sides of different quality. Therefore, the invention provides, in a further development, that the sheet is subsequently split along its center plane in order to produce two sheets having half the whole thickness.

The splitting of the sheets is particularly useful because the initially produced sheets may have a relatively large wall thickness which usually makes the manufacture of the sheets easier, as compared to very thin sheets. By subsequently splitting the sheets, two sheets having half the wall thickness are produced, each having a principal side located at the outside prior to splitting and an inner side created by the splitting.

For a further treatment of the sheets, the method in accordance with the invention provides that, prior to splitting, the principal side of the sheets located outwardly is cleaned, is printed after cleaning, and is subsequently varnished.

The sheets prepared in this manner can then be made available to further processing. A preferred field of application of the invention is the production of shoe soles. In this regard, it is provided in accordance with the invention that, from the sheets which have been cast, split, cleaned, printed, and varnished, the blanks which are subjected to abrasion, particularly shoe soles, are punched out.

The invention also provides that, after punching out the blanks, the edges are finished by means of milling or the like. According to a further development, after milling the edges, a plurality of shaped pieces are combined, stacked, and pressed and the block of shaped pieces obtained in this manner is varnished at its edge.

As is known, for example, from the manufacture of shoe soles from a rubber product, the invention also provides that, in the production of shoe sole blanks, the blanks are pared in the region of the joint by removing material starting from the unvarnished side.

An apparatus for carrying out the method according to the invention includes a reaction casting machine for carrying out the high-pressure casting method referred to above, followed by a splitting machine, a cleaning unit, a printing unit, a varnishing unit, and a multiple punching machine.

The invention is also directed to a shoe sole as a blank punched from foil or sheet material.

It is known to punch shoe soles from leather or rubber, to process the blanks further and to add the blanks to the shoes either during their manufacture, or to renew the soles when shoes are being repaired. Leather and rubber blanks have certain advantages. As a rule, depending upon their thickness, they are supple, flexible, and have a certain strength against abrasion which, however, still does not provide the desired service life. It is the object of the invention to increase in a shoe sole particularly the stability, i.e., the resistance against abrasion, without giving up the favorable properties of such materials as leather or rubber.

In a shoe sole formed from a blank punched from foil material, this object is met by forming a blank from a sheet made from a mixture of polyol with filler and isocyanate.

In a further development, the invention provides that up to 30% filler are provided in the blank material, particularly chalk being used as filler.

In accordance with the invention, it may also be provided that the blank is formed from an unfinished sheet which is split along the center plane, which has the advantage that the sheet can initially be manufactured having double thickness. The sheet is subsequently split so that two sheets result which have that thickness which the shoe soles are to have later.

In accordance with the invention, it is also provided that the shoe sole, on its side facing the shoe body in the position of use, is pared in the region of the joint, as this is known in shoe sole blanks from rubber.

In a further development, the invention also provides that the principal side of the shoe sole facing outwardly in the position of use is printed with a leather-like design and is subsequently varnished with clear lacquer and/or that the edges created during punching are deburred or milled in some other manner and are smoothened and varnished.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE PREFERRED EMBODIMENT

Figure 1:
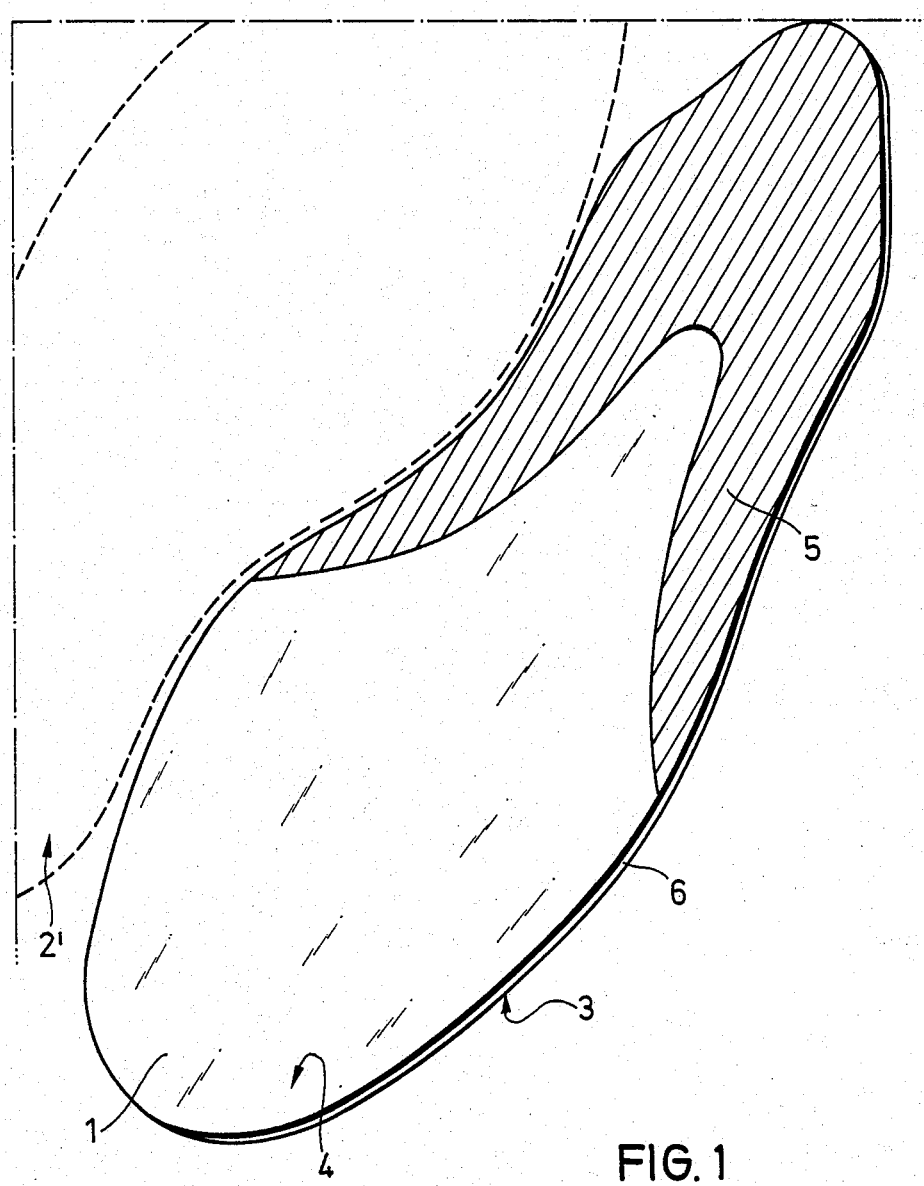
FIG. 1 is a perspective view of a shoe sole blank in accordance with the invention with a top view of the inner side which, in the position of use, faces the shoe body.
Figure 2:
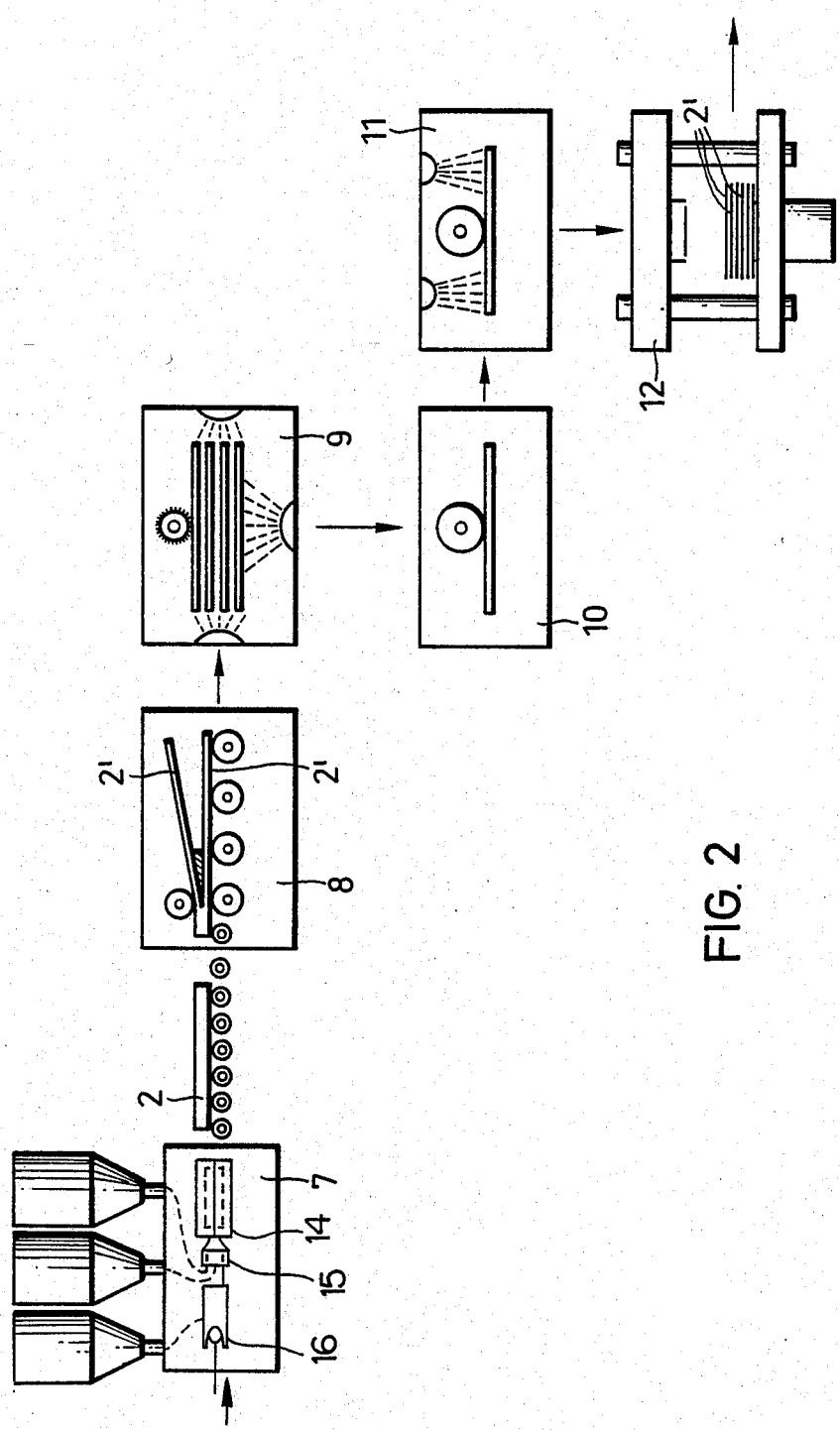
FIG. 2 shows a flow diagram of an apparatus for carrying out the method.

The shoe sole 1 shown in FIG. 1 is prepared as a blank from a sheet 2', shown in broken lines, from a mixture of polyol with a filler and isocyanate. It is important in this regard that the sheet 2' shown is here already present as a split unfinished sheet, i.e., the initial sheet 2 is twice as thick and has been separated along its center plane, as is illustrated in FIG. 2.

The bottom side or walking side 3 of the shoe sole 1 is printed with a leather-like design and varnished with a clear lacquer, not shown in detail.

The side 4 of the shoe sole 1 which faces the shoe body in the position of use is pared in the joint region 5, i.e., a portion of the material is removed by means of milling cutters or other tools, so that the shoe sole 1 is made more supple, particularly in this region.

The edges 6 are deburred or rounded. Depending upon fashion, this burr or this end region can be prepared differently, either with a sharp edge or substantially rounded off or the like. This edge is also varnished.

FIG. 2 shows, in principle, a flow diagram of the apparatus according to the invention.

A reaction casting machine 7 includes an injection mold 14, a mixing head 15 and pressure cylinder 16. The reaction casting machine 7 is followed by a splitting machine 8 in which a plastic sheet 2, produced in the reaction casting machine, is split into two half sheets 2'.

The splitting machine 8 is followed in the processing sequence by a cleaning unit 9, a printing unit 10 for printing on at least one surface of an unfinished sheet 2', and the latter is followed by a varnishing unit 11 which varnishes the printed surface.

For producing blanks from the unfinished sheets 2 or 2', a multiple punching machine 12 is arranged subsequently.

Of course, the described embodiment can be modified in many respects without leaving the basic concept of the invention. Thus, the invention is particularly not limited to the described preferred embodiment for use in the manufacture of shoe soles and also not to the types of apparatus parts which are symbolically represented. Of course, the fields of application of the invention are where leather or rubber materials have been used in the past and corresponding properties with respect to strength, particularly resistance to wear, were required. Of course, the invention can also be used, for example, in the furniture industry and in the manufacture of articles of imitation leather, such as suitcases, bags, or the like. It can be used in industry as machine shims, as damping elements, as sealing members, and the like.

I claim:

1. A method of manufacturing shoe soles, comprising the steps of high pressure casting a sheet of plastics material from a mixture of polyol and a filler portion in an amount not exceeding 30% with the addition of isocyanate, splitting said sheet along its center plane so that two half sheets having half the wall thickness of said sheet are obtained, said half sheets each having a principal side and an inner side, punching blanks in the form of shoe soles from said sheet, cleaning each principal side prior to splitting, and printing and subsequently varnishing each prinicpal side prior to splitting.

2. The method of claim 1, wherein chalk is used as filler.

3. The method of claim 1, wherein the edges of said shoe soles are finished by means of milling cutters.

4. The method of claim 1, wherein a plurality of blanks are combined, stacked and pressed to form a block of blanks, and the edges of said block are varnished.

5. The method of claim 1, wherein said shoe soles are pared in the region of their joints by removing material starting from the unvarnished side.

* * * * *